(12) United States Patent
Miller et al.

(10) Patent No.: US 7,604,215 B1
(45) Date of Patent: Oct. 20, 2009

(54) CAR SEAT MOTION SIMULATING APPARATUS

(76) Inventors: David R Miller, 503 Highland Ave., Middletown, PA (US) 17057; Kristy A. Miller, 503 Highland Ave., Middletown, PA (US) 17057

( * ) Notice: Subject to any disclaimer, the term of this patent is extended or adjusted under 35 U.S.C. 154(b) by 264 days.

(21) Appl. No.: 11/708,077

(22) Filed: Feb. 20, 2007

(51) Int. Cl.
  *F16M 13/00* (2006.01)
(52) U.S. Cl. .................. 248/603; 248/371; 248/581; 434/29
(58) Field of Classification Search .............. 248/371, 248/581, 583, 603, 614, 618; 434/29, 62, 434/61, 67; 472/13
See application file for complete search history.

(56) References Cited

U.S. PATENT DOCUMENTS

| | | | |
|---|---|---|---|
| 4,066,256 A * | 1/1978 | Trumbull | 472/60 |
| 5,473,990 A * | 12/1995 | Anderson et al. | 104/85 |
| 5,853,330 A * | 12/1998 | Engstrand | 472/60 |
| 5,980,256 A * | 11/1999 | Carmein | 434/55 |
| 2003/0125119 A1* | 7/2003 | Jones | 472/60 |
| 2007/0218427 A1* | 9/2007 | Lefton | 434/29 |
| 2007/0269770 A1* | 11/2007 | Pellegrino et al. | 434/15 |
| 2008/0124683 A1* | 5/2008 | Medford | 434/29 |

* cited by examiner

*Primary Examiner*—Amy Sterling

(57) ABSTRACT

A car seat motion simulating apparatus is disclosed. An illustrative embodiment of the apparatus includes a base; a support carried by the base; a main cylinder carried by the support and a main piston extendable from the main cylinder; a plurality of motion cylinders carried by the support and a plurality of motion pistons extendable from the plurality of motion cylinders, respectively; a platform carried by the main piston and the plurality of motion pistons; an air compressor connected to the main cylinder and the plurality of motion cylinders, respectively; and a motion controller connected to the air compressor.

5 Claims, 5 Drawing Sheets

CAR SEAT MOTION SIMULATING APPARATUS

FIELD

The present invention relates to infant car seats. More particularly, the present invention relates to an apparatus which simulates motion of an infant car seat in a moving vehicle to soothe and pacify an infant.

BACKGROUND

Infant car seats are strapped into vehicles to hold infants in a secure manner during operation of the vehicle. The natural motions of a vehicle have been known to soothe and pacify infants secured in a car seat in the vehicle, frequently inducing sleep in the infant. Therefore, a car seat motion simulating apparatus is needed which simulates the motions of an infant car seat in a vehicle to soothe and pacify an infant.

SUMMARY

The present invention is generally directed to a car seat motion simulating apparatus. An illustrative embodiment of the apparatus includes a base; a support carried by the base; a main cylinder carried by the support and a main piston extendable from the main cylinder; a plurality of motion cylinders carried by the support and a plurality of motion pistons extendable from the plurality of motion cylinders, respectively; a platform carried by the main piston and the plurality of motion pistons; an air compressor connected to the main cylinder and the plurality of motion cylinders, respectively; and a motion controller connected to the air compressor.

BRIEF DESCRIPTION OF THE DRAWINGS

The invention will now be described, by way of example, with reference to the accompanying drawings, in which.

DETAILED DESCRIPTION

Figure 1:
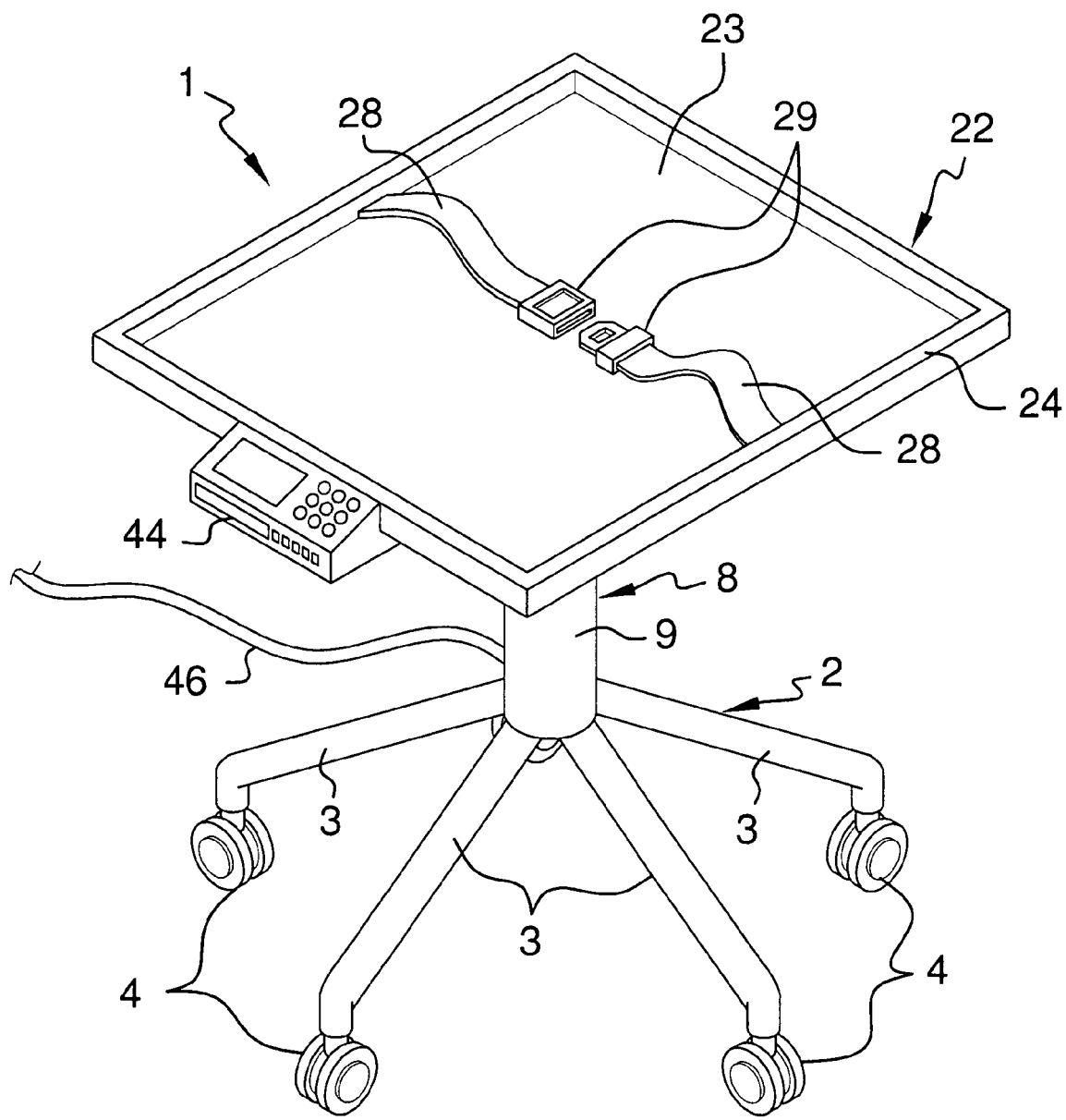
FIG. 1 is a front perspective view of an illustrative embodiment of the car seat motion simulating apparatus.
Figure 2:
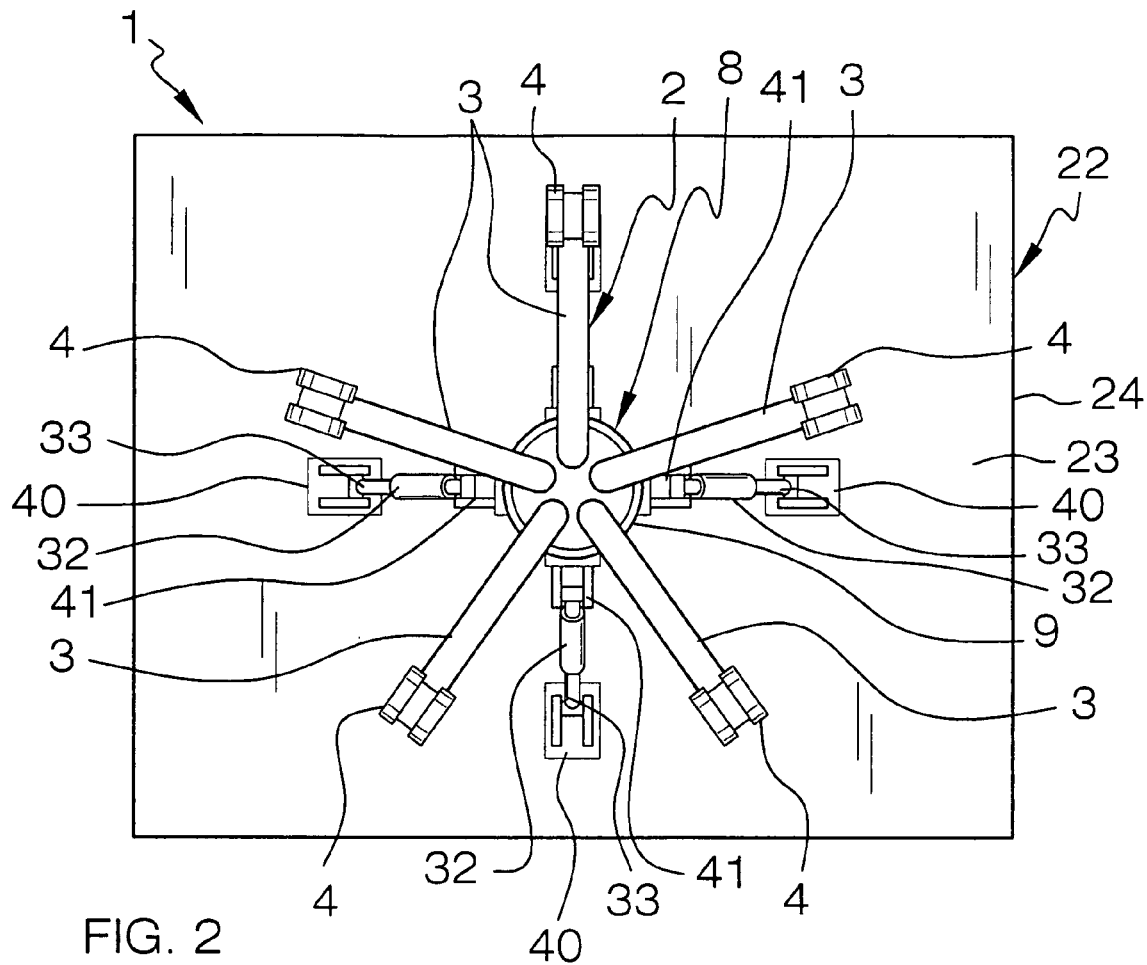
FIG. 2 is a bottom view of an illustrative embodiment of the car seat motion simulating apparatus.

Referring to the drawings, an illustrative embodiment of the car seat motion simulating apparatus, hereinafter apparatus, is generally indicated by reference numeral 1. As shown in FIGS. 1 and 2, the apparatus 1 includes a base 2. In some embodiments of the apparatus 1, the base 2 is stationary and can be fixedly attached to a floor (not shown) or other suitable support. In other embodiments, the base 2 is mobile and may include multiple, such as five, for example, base legs 3 which extend outwardly from a lower end of a support 8, in spaced-apart relationship with respect to each other. A base wheel 4, which may be selectively lockable, is provided on each base leg 3.

Figure 6:
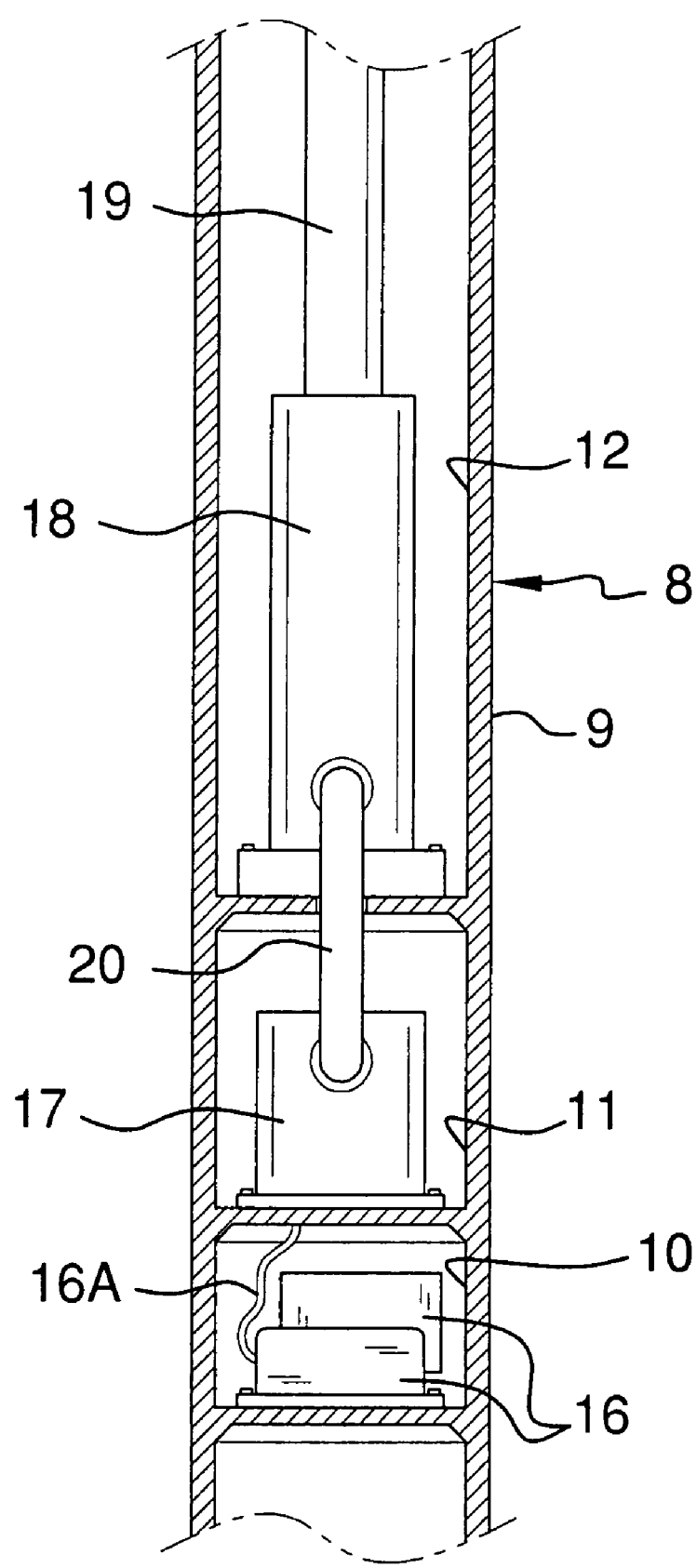
FIG. 6 is a longitudinal sectional view, taken along section lines 6-6 in FIG. 4, of a support element of an illustrative embodiment of the car seat motion simulating apparatus.

As shown in FIG. 6, the support 8 typically includes a generally elongated, cylindrical support housing 9. A battery compartment 10, a compressor compartment 11 and a cylinder compartment 12 are provided in the support housing 9. A pneumatic main cylinder 18, from which is extendable a main piston 19, is provided in the cylinder compartment 12. The main piston 19 is extendable from the upper end of the support 8. An electric air compressor 17 is provided in the compressor compartment 11 and is pneumatically connected to the main cylinder 18 through an air conduit 20. At least one battery 16 is provided in the battery compartment 11 and is electrically connected to the air compressor 17 through battery wiring 16a.

Figure 3:
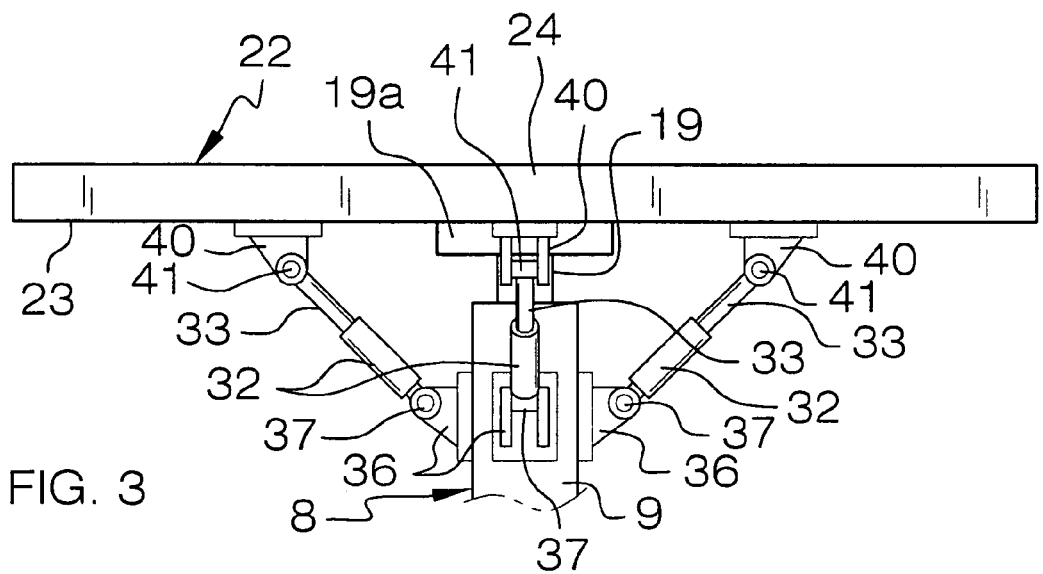
FIG. 3 is a side view, partially in section, of an illustrative embodiment of the car seat motion simulating apparatus.
Figure 4:
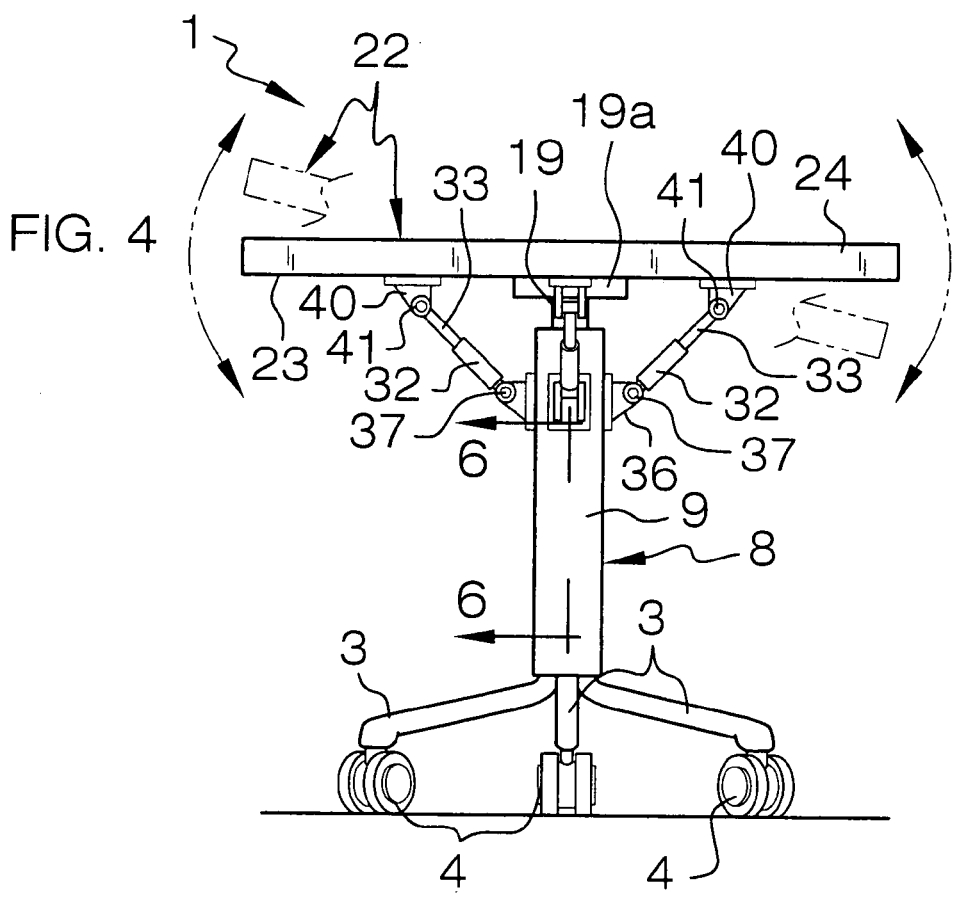
FIG. 4 is a side view of an illustrative embodiment of the car seat motion apparatus, more particularly illustrating multi-positional movement of a platform element of the car seat motion simulating apparatus.
Figure 5:
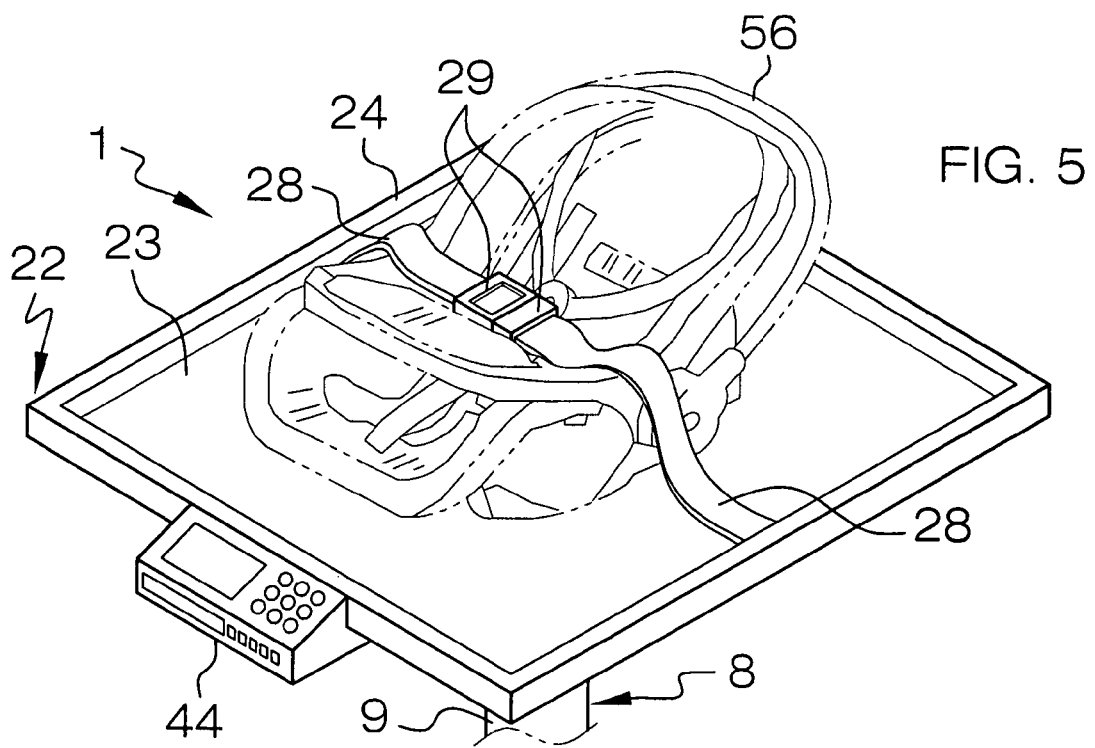
FIG. 5 is a perspective view, partially in section, of a platform element of an illustrative embodiment of the car seat motion simulating apparatus, more particularly illustrating an infant car seat (in phantom) provided on the platform.

As shown in FIGS. 2-4, a platform 22 is provided on the support 8. The platform 22 includes a platform panel 23 which is provided on the main piston 19. The platform panel 23 may be pivotally attached to the main piston 19 through a piston coupling 19a, for example. In some embodiments of the apparatus 1, a platform lip 24 extends from the platform panel 23, at the perimeter thereof. A safety strap 28, fitted with a buckle 29, may be provided on the platform 22. As shown in FIG. 5, the safety strap 28 is adapted to secure an infant car seat 56 (in phantom), which may be conventional, to the platform 22 in use of the apparatus 1, which will be hereinafter described.

Multiple motion cylinders 32 and motion pistons 33 which are extendable from the respective motion cylinders 32 are interposed between the support housing 9 of the support 8 and the platform panel 23 of the platform 22. Each motion cylinder 32 is pivotally attached to the support housing 9 through, for example, a cylinder flange 36 which extends from the support housing 9 and a cylinder pin 37 which attaches the motion cylinder 32 to the cylinder flange 36. Each motion piston 33 is pivotally attached to the platform panel 23 through, for example, a piston flange 40 which extends from the platform panel 23 and a piston pin 41 which attaches the motion piston 33 to the piston flange 40.

Figure 7:
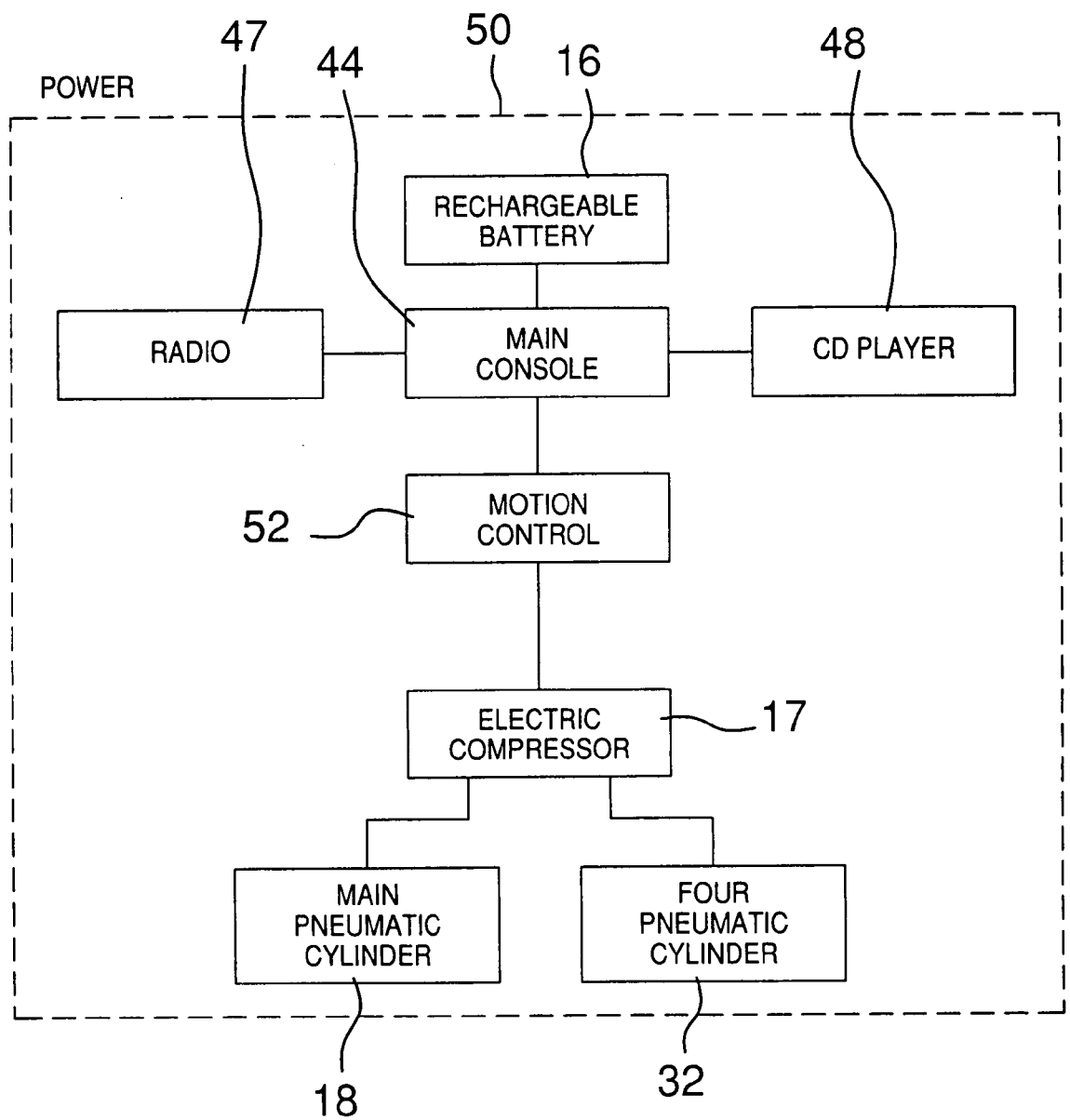
FIG. 7 is a block diagram illustrating functional components of an illustrative embodiment of the car seat motion simulating apparatus.

As shown in FIG. 7, the apparatus 1 includes a main controller or console 44 having a memory. The main console 44 may be provided in any suitable location on the apparatus 1, such as on the platform 22, for example, as shown in FIGS. 1 and 5. Controls (not shown) on the main console 44 may include, for example, a power switch; a motion selector; and a timer. The at least one battery 16 (FIG. 6), which may be at least one rechargeable battery, for example, is connected to the main console 44. A power cord 46 (FIG. 1) is connected to the at least one rechargeable battery 16 for connection to a suitable external power source 50. In some embodiments of the apparatus 1, a radio 47 and/or a CD player 48 is connected to the main console 44. A motion controller 52 is connected to the main console 44 and to the air compressor 17 (FIG. 6). In turn, the air compressor 17 is connected to the main cylinder 18 and each of the motion cylinders 32. Accordingly, responsive to input from the main console 44, the motion controller 52, through the air compressor 17, facilitates operation of the main cylinder 18 and the motion cylinders 32 in a predetermined sequence or pattern to impart motion which simulates motion of a moving vehicle, such as bumps, turns and hills, for example, to the platform 22. The predetermined motion sequence or pattern for the platform 22 is programmed into the memory of the main console 44 according to the knowledge of those skilled in the art. Various courses of motion sequences or patterns can be programmed into the main console 44 for selection by a user.

In typical use of the apparatus 1, the at least one rechargeable battery 16 is charged typically by plugging the power cord 46 (FIG. 7) into a suitable external power source 50 such as an electrical outlet, for example. The infant car seat 56 is attached to the platform 22 such as by fastening the safety strap 28 around the infant car seat 56, as shown in FIG. 5, and an infant (not shown) is strapped in the infant car seat 56. Additional or alternative attachment or fastening devices (not shown) may be provided on the platform 22 to secure the infant car seat 56 to the platform 22. A course of motion sequences or patterns, as well as the duration of the course, can be selected using the appropriate control of the main console 44. Accordingly, the main console 44, through the motion controller 52 (FIG. 7), operates the air compressor 17 according to the course which is selected. The air compressor 17, in turn, operates the main cylinder 18 and the motion cylinders 32 to raise, lower and tilt the platform 22 in various directions, as indicated by the arrows in FIG. 4, and simulate the motion of a vehicle in which the infant car seat 56 is strapped. These motions soothe and pacify the infant (not shown) as the infant lies in the infant car seat 56. The radio 47 and/or the CD player 48 can additionally be played to enhance the soothing effect of the motion imparted to the infant car seat 56 by the platform 22. The apparatus 1 can be selectively transported, as desired, by rolling the base wheels 4 on a floor (not shown) or other supporting surface.

While the preferred embodiments of the invention have been described above, it will be recognized and understood that various modifications can be made in the invention and the appended claims are intended to cover all such modifications which may fall within the spirit and scope of the invention.

What is claimed is:

1. An apparatus, comprising:
a base having a plurality of spaced-apart base legs and a plurality of base wheels provided on said plurality of base legs, respectively;
a support having a generally elongated, cylindrical support housing carried by said base legs of said base;
a battery compartment, a compressor compartment and a cylinder compartment provided in said support housing;
at least one battery provided in said battery compartment, an air compressor provided in said compressor compartment, a main cylinder provided in said cylinder compartment and pneumatically connected to said air compressor and a main piston extendable from said main cylinder and said support housing;
a plurality of motion cylinders pivotally carried by said support housing of said support and a plurality of motion pistons extendable from said plurality of motion cylinders, respectively;
a platform pivotally carried by said main piston and said plurality of motion pistons, respectively;
a motion controller connected to said air compressor; and
a main console connected to said motion controller and said at least one battery.

2. The apparatus of claim 1 further comprising a platform lip extending from said platform panel.

3. The apparatus of claim 1 further comprising a safety strap having a buckle provided on said platform.

4. The apparatus of claim 1 further comprising a radio connected to said main console.

5. The apparatus of claim 1 further comprising a CD player connected to said main console.

* * * * *